UNITED STATES PATENT OFFICE.

GUSTAV A. LIEBIG AND JOHN F. GIBBONS, OF BALTIMORE, MARYLAND.

TREATING PHOSPHATES OF ALUMINA AND IRON.

SPECIFICATION forming part of Letters Patent No. 301,248, dated July 1, 1884.

Application filed May 12, 1883. (No specimens.)

*To all whom it may concern:*

Be it known that we, GUSTAV A. LIEBIG and JOHN F. GIBBONS, of the city of Baltimore and State of Maryland, have invented a new and useful method of treating phosphates or phosphorites containing iron or alumina for the purpose of converting them into the superphosphates of commerce, of which the following is a full and exact description.

It is well known that extensive deposits of mineral phosphates containing a large quantity of iron or alumina, or both, exist in this and other countries. We propose to deal with two classes of these phosphates, viz: first, those mineral phosphates which contain lime with iron and alumina, either or both, in considerable quantities, with free oxide of iron; second, those phosphates which contain iron or alumina, or both, in considerable quantities, without free oxides and without lime, or with traces only of lime. The first of these classes—those which contain free oxides—we prefer to have burned or calcined before applying the acid, for the reason that by calcining the free oxides become insoluble, or nearly so, and thus the action of the dilute acid is confined to the phosphates—viz., of lime, iron, or alumina. These phosphates may be calcined by simply burning or roasting them alone, and without mixing them with carbonaceous or other matter to prepare them for the action of the acid. To the second class—viz., those which contain iron or alumina, or both, in considerable quantities, without free oxides and without lime, or with traces only of lime—calcining is unnecessary, and to these phosphates we apply directly the acid diluted as hereinafter described.

It is well known that the sulphuric acid as known in the market and sold for commercial purposes varies in strength from 47° to 66° Baumé, and all efforts to use these acids in converting these iron and alumina phosphates directly into commercial superphosphates have resulted in failure, for the reason, as we believe, that the acid, even of the lowest grade, is too strong, and when applied forms a sticky, gummy mass, requiring months to dry. We therefore employ dilute acid of a strength between 32° and 47°, according to the amount of water contained in the phosphorite—*i. e.*, if it be wet, we use the acid, say, at 47°, because the water in the material will dilute and weaken the acid to the required strength; if the phosphate be dry, then the lower grade, or about 32°, will accomplish the purpose. The dilute acid may be applied either hot or cold.

We believe we are the first who have ever converted these phosphorites containing iron and alumina in considerable quantities into commercial superphosphates, directly and without any intermediate process, from the crude material, or directly from the calcined material, when burned or calcined alone and not in conjunction with other substances.

We cannot give the exact proportions of acid to the phosphorite, as these will vary with the character and condition of the phosphate to be treated.

What we claim, and desire to secure by Letters Patent, is—

The above-described method of converting mineral phosphates containing iron or alumina in quantity into commercial superphosphates, by treating them with dilute acid of the specific gravity above described, substantially in the manner and for the purposes set forth.

GUSTAV A. LIEBIG.
JOHN F. GIBBONS.

Witnesses:
W. SIMON,
G. A. LIEBIG, Jr.